June 24, 1969  J. M. TAYLOR  3,451,499
VAN TYPE VEHICLE
Filed Aug. 11, 1967
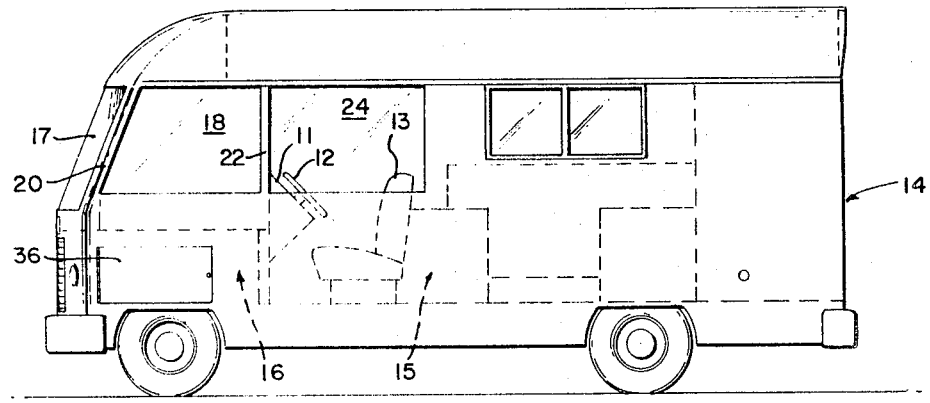
FIG__2
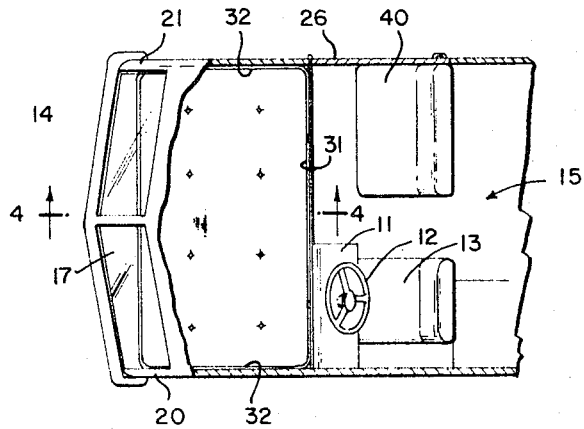
FIG__3
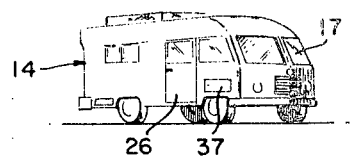
FIG__1
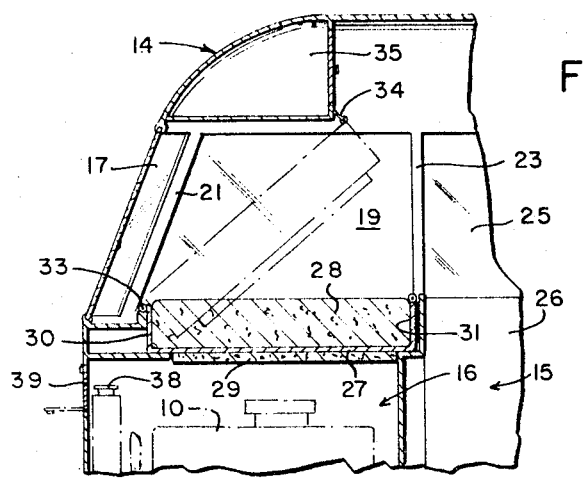
FIG__4
JEAN M. TAYLOR
INVENTOR.
BY *Seed, Berry & Downey*
ATTORNEYS

3,451,499
VAN TYPE VEHICLE
Jean M. Taylor, 1800 Lake Washington Blvd., Box 25,
Renton, Wash. 98055
Filed Aug. 11, 1967, Ser. No. 659,921
Int. Cl. B62d *39/00*
U.S. Cl. 180—89                                       1 Claim

ABSTRACT OF THE DISCLOSURE

A house car or utility vehicle having a standard front-engine passenger or truck chassis and a van body extending the full length of the chassis with the driver/passenger location remaining behind the engine and the extended frontal area over the engine between the windshield and the dashboard being used for a bed, display area, desk top, counter or work bench.

---

This invention relates to improvements in van-type motor vehicles having front engines wherein the vehicle body extends over the engine to the front of the chassis. In the past the driver's seat in such a vehicle has been located in one of the front corners of the body alongside of the engine, and commonly a passenger seat has been provided in the other front corner. Such an arrangement places the driver and passenger in particularly dangerous locations in case of an accident, and is not conducive to their riding comfort since they are located directly over the front axle. Van-type vehicles have not only found wide commercial use but have also been adapted for house-car or camper use.

The present invention aims to provide an improved van-type vehicle locating the driver and passenger seats in much safer and more comfortable positions without sacrificing use of the space adjoining the engine within the van body, particularly when used as a house car. In carrying out this objective a further aim is to make possible the use of a substantially standard front-engine passenger car or truck chassis of the type in which the driver is located behind the engine. By this invention, instead of having the passenger compartment commence behind the engine on such a chassis, the passenger compartment starts at the very front of the chassis as in the present van-type vehicles, and the frontal area above the engine below the level of the dashboard is utilized for a bed or other purposes. In other words the engine hood area of the vehicle is included within the van-type body.

In the accompanying drawings:

FIG. 1 is a perspective view of a vehicle embodying the invention;

FIG. 2 is a side elevational view of the vehicle taken on the driver's side;

FIG. 3 is a fragmentary top view of the front portion of the vehicle with the top broken away; and FIG. 4 is a fragmentary vertical sectional view taken along the line 4—4 of FIG. 3.

Referring to the drawings, the present invention employs a standard automotive or truck chassis with a front engine 10. The dashboard 11, steering wheel 12, and driver's seat 13 are mounted to the left and rear of the engine as is conventional in most automobiles. In accordance with the present invention the body 14 of the vehicle provides the passenger compartment 15 and engine compartment 16, and instead of having its windshield situated immediately in front of the dashboard and behind an engine hood, has its windshield 17 located at the front of the chassis in the manner common in front-engine utility trucks of the type in which the driver is seated at the very front of the chassis alongside of the engine.

The vehicle body 14 may be externally styled as desired, but to insure good driving vision it preferably should have a virtually unobstructed window area on both sides from the driver's seat forward. This can be accomplished by a set of front side windows 18–19 between front corner posts 20–21 and side posts 22–23 positioned at about the front of the dashboard, and a second set of side windows 24–25 directly to the sides of the driver. Window 25 is provided by a side door 26 hinged to the post 23, and it is preferred for safety that a second door (not shown) be provided at the rear of the body. Additional windows may be provided as desired to illuminate other areas in the body to the rear of the driver.

By the present invention the engine compartment 16 is covered by a movable partition 27, which, when the vehicle is to be used as a mobile home or camper, becomes the base of a bed frame for a mattress 28. The partition 27 may be provided on its underside with an insulating panel 29 and is preferable equipped with side rails 31–32 and end rails 32 making a box-like frame or container for holding the mattress. For ease of removal of the bed to give overhead access to the engine, the bed frame is hinged at 33 along the top of the front side rail 30 to the frame section at the base of the windshield. A hook 34 or other suitable fastener is provided at the top of the rear side rail 31 to cooperate with an eye fitting at the base of a front storage compartment 35 or other overhead structure.

Further access to the engine compartment is had through hinged side doors 36–37. These doors may be formed in their inner sides with storage pockets, shelves or drawers for tools and other items. For ease of access to the radiator cap 38, the front of the vehicle is fitted with an appropriate door 39.

A wide passenger seat 40 is mounted alongside of the driver's seat 13 with an aisle therebetween, and the passenger seat may be pivotally mounted so as to be swingable to the rear for giving easy passage through the side door 26 and to provide seating at the front of a removable table (not shown). The rest of the vehicle area can be used as desired, as for example, by locating a lavatory compartment in the left rear corner, a clothes closet and other storage in the right rear corner, a stove, refrigerator, sink, counter, and ovehead storage between the lavatory and driver's seat 13, and a third forwardly facing seat behind the table.

By proper adjustment of the height of the driver's seat 13 the driver can be assured of an excellent driving vision range both in train and elevation. In case of a front end collision the driver and passenger are in a much safer position than if they were located in the front corners alongside of the engine. Also, because their seats are located well behind the front axle, they will be subjected to less road shock.

Although the vehicle is particularly adaptable for use as a house car, the frontal area over the engine compartment may be utilized as a display area, desk top, counter or work bench when the vehicle has a sales, office, laboratory or shop function.

It is believed that the invention will have been clearly understood from the foregoing detailed description of my now-preferred illustrated embodiment. Changes in the details of construction may be resorted to without departing from the spirit of the invention.

I claim:

1. A van-type motor vehicle comprising, a vehicle chassis with a front engine, a van body mounted in the chassis and providing a front engine compartment housing the engine and a passenger compartment extending forwardly directly over the engine compartment, a driver's station in the passenger compartment behind the engine compartment, said body having a windshield across its front located above and forwardly of most of the engine compartment and having side windows in both sides of the body extending from the windshield rearwardly at least as far as the driver's station, a bed frame separating the top of said engine compartment from said passenger compartment, said bed frame being hinged along its forward edge to swing upwardly, and means for selectively holding the rear edge of the bed frame in raised position.

References Cited

UNITED STATES PATENTS

| | | |
|---|---|---|
| 1,781,322 | 11/1930 | Delling. |
| 2,480,047 | 8/1949 | Reinhard _____ 180—89 X |
| 2,190,218 | 2/1940 | Paton _____ 296—64 |
| 2,298,773 | 10/1942 | Nicol _____ 180—89 |
| 2,502,622 | 4/1950 | Harris _____ 296—28 |
| 3,266,062 | 8/1966 | Rogers _____ 5—118 |

FOREIGN PATENTS 1,037,730   8/1966   Great Britain.

OTHER REFERENCES

German Printed Application DAS 1,091,441, October 1960, General Motors, 180–89.

KENNETH H. BETTS, *Primary Examiner.*

J. A. PEKAR, *Assistant Examiner.*

U.S. Cl. X.R.

296—28